US009873212B2

(12) United States Patent
Basire

(10) Patent No.: US 9,873,212 B2
(45) Date of Patent: Jan. 23, 2018

(54) PROCESS FOR THE TREATMENT OF TECHNICAL TEXTILES

(75) Inventor: Charlotte Basire, Marennes (FR)

(73) Assignee: Rhodia Operations, Aubervilliers (FR)

( * ) Notice: Subject to any disclaimer, the term of this patent is extended or adjusted under 35 U.S.C. 154(b) by 610 days.

(21) Appl. No.: 14/006,857

(22) PCT Filed: Mar. 29, 2012

(86) PCT No.: PCT/EP2012/055652
§ 371 (c)(1),
(2), (4) Date: Oct. 30, 2013

(87) PCT Pub. No.: WO2012/130949
PCT Pub. Date: Oct. 4, 2012

(65) Prior Publication Data
US 2014/0042252 A1 Feb. 13, 2014

(30) Foreign Application Priority Data
Mar. 31, 2011 (FR) ..................... 11 52702

(51) Int. Cl.
| | |
|---|---|
| *B29B 17/00* | (2006.01) |
| *B29B 17/02* | (2006.01) |
| *B29B 17/04* | (2006.01) |
| B29K 77/00 | (2006.01) |
| B29K 83/00 | (2006.01) |
| B29K 283/00 | (2006.01) |
| B29L 22/02 | (2006.01) |
| B29L 31/00 | (2006.01) |

(52) U.S. Cl.
CPC .............. *B29B 17/02* (2013.01); *B29B 17/04* (2013.01); *B29B 17/0026* (2013.01); *B29B 2017/0203* (2013.01); *B29B 2017/0231* (2013.01); *B29B 2017/0244* (2013.01); *B29B 2017/0296* (2013.01); *B29K 2077/00* (2013.01); *B29K 2083/00* (2013.01); *B29K 2283/00* (2013.01); *B29K 2313/02* (2013.01); *B29K 2913/02* (2013.01); *B29L 2022/027* (2013.01); *B29L 2031/726* (2013.01); *Y02W 30/524* (2015.05); *Y02W 30/62* (2015.05); *Y02W 30/622* (2015.05); *Y02W 30/625* (2015.05)

(58) Field of Classification Search
CPC .................... B29B 17/02; B29B 17/04; B29B 2017/0203; B29B 2017/0231; B29B 2017/0296; B29B 2017/0244; B29B 17/0404; B29B 17/0047; Y02W 30/524; Y02W 30/625; Y02W 30/622; Y02W 30/62; B29L 2031/726; B29L 2022/027; B29K 2083/00; B29K 2077/00; B29K 2913/02; B29K 2313/02

USPC ............................................... 209/3; 264/913
See application file for complete search history.

(56) References Cited

U.S. PATENT DOCUMENTS

| | | | | | |
|---|---|---|---|---|---|
| 2,695,425 | A | * | 11/1954 | Stott ..................... | B29B 17/04 264/104 |
| 4,161,464 | A | * | 7/1979 | Nicholas .................. | C08J 11/28 521/41.5 |
| 5,302,332 | A | | 4/1994 | Simola et al. | |
| 6,335,377 | B1 | * | 1/2002 | Izumoto .................. | B29B 17/00 521/41 |
| 6,380,269 | B1 | * | 4/2002 | Benko ...................... | C01B 3/342 219/121.36 |
| 6,911,546 | B2 | | 6/2005 | Hedrick et al. | |
| 6,916,936 | B2 | | 7/2005 | Hedrick et al. | |
| 9,115,261 | B2 | * | 8/2015 | Mignani .................. | C08J 11/04 |
| 2003/0009008 | A1 | * | 1/2003 | Takenaka ................. | C08J 11/06 528/502 F |
| 2005/0051926 | A1 | | 3/2005 | Guillot et al. | |
| 2009/0126122 | A1 | * | 5/2009 | Nickel .................... | B29B 17/02 8/137 |
| 2010/0012623 | A1 | | 1/2010 | Mignani | |
| 2012/0196332 | A1 | * | 8/2012 | Muniglia .................. | A23D 9/02 435/99 |
| 2013/0099029 | A1 | * | 4/2013 | Laborde Aguirre ...... | B29B 9/14 241/24.1 |

FOREIGN PATENT DOCUMENTS

| | | | | |
|---|---|---|---|---|
| EP | | 0950684 A2 | * 10/1999 | ............. B29B 17/02 |
| EP | | 950684 A2 | 10/1999 | |
| FR | | 2856625 A1 | 12/2004 | |
| JP | | H0633378 A | 2/1994 | |
| JP | | 2003119330 A | 4/2003 | |
| JP | | 2003191239 A | 7/2003 | |
| JP | | 2004018614 A | 1/2004 | |
| WO | | 9740941 A1 | 11/1997 | |
| WO | | 01/12333 A1 | 2/2001 | |
| WO | | 2007009856 A1 | 1/2007 | |
| WO | | 2007135140 A1 | 11/2007 | |
| WO | | 2008032052 A1 | 3/2008 | |
| WO | | 2008043764 A1 | 4/2008 | |

* cited by examiner

*Primary Examiner* — James S McClellan
*Assistant Examiner* — Peter Iannuzzi
(74) *Attorney, Agent, or Firm* — Osha Liang LLP

(57) ABSTRACT

The present invention relates to a process for the treatment of technical textiles based on thermoplastic fibers and comprising a coating, such as, in particular, airbags, using the principle of centrifugal decanting to separate the fiber residues and the coating material. The invention also relates to a process for the manufacture of a thermoplastic composition, in particular for molding, obtained by use of the fiber residues as obtained and optionally of reinforcing fillers. The distinguishing feature of this invention is based on the preparation of the fabric devoid of coating, thus resulting in formulations with elevated mechanical performances.

12 Claims, No Drawings

PROCESS FOR THE TREATMENT OF TECHNICAL TEXTILES

RELATED APPLICATIONS

This application is a U.S. national stage entry under 35 U.S.C. §371 of International Application No. PCT/EP2012/055652, filed Mar. 29, 2012, which claims priority to FR Application No. 1152702 filed on Mar. 31, 2011. The entire contents of these applications are explicitly incorporated herein by this reference.

The present invention relates to a process for the treatment of technical textiles based on thermoplastic fibers and comprising a coating, such as, in particular, airbags, using the principle of centrifugal decanting to separate the fiber residues and the coating material. The invention also relates to a process for the manufacture of a thermoplastic composition, in particular for molding, obtained by use of the fiber residues as obtained and optionally of reinforcing fillers. The distinguishing feature of this invention is based on the preparation of the fabric devoid of coating, thus resulting in formulations with elevated mechanical performances.

PRIOR ART

Technical textiles are articles, generally knitted, woven or nonwoven, composed of thermoplastic fibers for specific applications, such as flame retardancy, mechanical strength, electrical and/or thermal conductivity, or the protection of personnel, for example. They are generally surface treated with a coating, for example applied by coating.

Mention may be made, as examples of coated technical textiles, of airbags, which are inflatable protective bags used for the protection of the occupants of a vehicle, into which bags a gas is very rapidly injected by an explosive chemical reaction, in order to inflate them and thus to cushion the impacts. When connected to impact detection sensors and located at the front of the hood and at the base of the windshield, they become inflated and limit the risks of serious injury during an impact with a pedestrian or a vehicle. These articles generally comprise a bag based on polyamide or on polyester, generally in the form of woven fabrics of fibers, over several layers, and a silicone coating on one of the faces. Airbags are very largely manufactured by deposition of a silicone composition which can crosslink to form a thin layer of silicone elastomer.

The problem arises of the recycling of these technical textiles, such as coated airbags, due to the incompatibility of the thermoplastic fibers and the polymers used for the coating, such as silicone. This is because it is very difficult to mechanically dissociate the two materials. Their direct reuse without pretreatment results in debased performances due to the presence of coating, which also detrimentally affects the surface appearance of the molded parts and often results in severe fouling of the molds during the injection.

As such, it is known, from Japanese patent application JP2003191239, to cut polyamide-based airbags into pieces and to extrude them in order to form granules ready to be used in the manufacture of molded articles. However, these articles, obtained from waste polyamide material, do not exhibit satisfactory mechanical properties. The literature describes processes which make it possible to incorporate polyamide textile waste in a virgin resin, such as in the document JP2004018614, to produce a regenerated polyamide having performances equivalent to those of a "new" material. The polyamide residues can result from airbags. No notification of the presence of silicone is mentioned, or of size of the residues. A description is given, in the application JP2003119330, of a process for recycling airbags with an ethylene/olefin copolymer grafted with maleic acid by melt blending. No notification of the presence of silicone, or of size of the residues, or of dispersion scale, is mentioned.

Furthermore, it is well-known to attempt to separate the polyamide material from the silicone material. The patent EP 0 950 684 describes a process for recycling polyamide comprising a silicone resin by use of an alkaline hydroxide in the presence of stirring and temperature and the neutralization by an acid. In the U.S. Pat. No. 6,911,546 and U.S. Pat. No. 6,916,936, the depolymerization of the coating is carried out in the presence of a nucleophilic reactant and of a carbene. This process has the effect of depolymerizing one of the constituents. The application WO2007/009856 describes a process for removing the silicone from the airbag fabric by combined use of a solution of alkaline hydroxide in the presence of quaternary ammonium. In the application WO2008/032052, the proposal is made to treat airbag waste or to recycle polyamides by the combined use of solution of alkaline hydroxide in the presence of surfactant and of alcohol at high temperature. The applications WO2007135140 and WO2008043764 relate to the depolymerization of the coating by the use of a phase transfer catalyst in a basic medium or of carbene.

However, these chemical processes do not result in perfect separation of the polyamide, on the one hand, and of the silicone coating, on the other hand. There thus exists a need to develop a process, simple to carry out, which makes possible optimum recycling, in particular in terms of yield, of technical textiles, without in particular detrimentally affecting or debasing the thermoplastic matrix.

There thus exists a need to make economic use of these technical textiles, in particular airbags, consisting of silicone-coated polyamide, of post-industrial or end-of-life origin, in the manufacture of recycled thermoplastic formulations exhibiting properties similar to those of the thermoplastic formulations of standard first choices.

INVENTION

It has just been demonstrated that the recycling of technical textiles, such as airbag residues, could be optimal by first manufacturing micrometric particles from these residues, treating them in order to eliminate the coating in an appropriate specific medium exhibiting a controlled density, and subsequently separating, by centrifugal force, the advantageous thermoplastic material. The thermoplastic material obtained can subsequently be used to produce thermoplastic granules and/or articles.

A subject matter of the present invention is thus a process for the treatment of technical textiles based on thermoplastic fibers comprising a coating, which comprises at least the following stages:

a) treating said textiles so as to obtain a mixture comprising at least:
  fibrous thermoplastic particles, and
  spherical or quasispherical particles of the coating material exhibiting a mean diameter of between 15 and 750 μm;

b) suspending the mixture obtained in stage a) with a medium which makes possible the separation of the coating material and fibrous thermoplastic particles; said medium exhibits a density between the density of the fibrous thermoplastic particles and the density of the coating material, in particular, said medium exhibits an alkaline pH and/or comprises organic or metal salts; very particularly, said medium exhibits an alkaline pH;

c) separating the coating material and the fibrous thermoplastic particles by centrifugal force;
d) optionally treating the fibrous thermoplastic particles recovered in stage c) in order to neutralise the pH;
e) drying the fibrous thermoplastic particles.

Within the meaning of the invention, technical textiles is understood to mean woven, nonwoven, braided or knitted articles based on thermoplastic fibers.

The thermoplastic fibers are generally fibers based on polyamide, polyolefin, polyester and/or polyurethane, for example. The coating is generally based on polyvinyl chloride, polyurethane, acrylic, elastomers and/or silicone, for example.

The coating on the thermoplastic fibers of the technical textiles can in particular be obtained by coating, complexing, impregnating or adherization. In the case of coating, the coating is generally applied in the liquid state and is followed by drying and optionally by crosslinking. Complexing is carried out by laminating onto a textile support. Impregnating can be carried out by solution, melt, dusting, hybridization or transfer processes. Adherization is a specific treatment of yarns or textiles intended to reinforce rubber. In order to obtain adhesion between the fibers and the elastomer after vulcanization, it is necessary to create chemical bridging by a treatment which will fix, to the fiber, a component which reacts with the rubber formulation.

Coating can be carried out on the textile surfaces by direct coating, roll or doctor blade coating, transfer coating, by lamination or assembling, by foaming, or by adhesive coating, for example.

Within the meaning of the invention, technical textile residues is understood to mean production waste, such as cuts or offcuts, in particular generated in the stages of application of coating or of cutting, or off-specification products which cannot be sold, or also articles or pieces of articles at the end of life. By way of example, the airbag residues generally comprise a bag, or a piece of bag, based on polyamide, polyester, polypropylene, polyvinyl chloride, polytetramethylene adipamide or polyurethane, for example. These articles are generally in the form of woven fabrics of fibers, over one or more layers, and generally comprise a coating based on silicone, on polyvinyl chloride, on polyurethane, on polyacrylate, on elastomeric polymers, such as rubbers, polyolefins, fluoroelastomers, EPDM or polychloroprene-based rubbers.

Preference is given in particular to the use of polyamide-based airbag residues. Preference is given in particular to the use of polyamide-based residues comprising a silicone-based coating.

Mention may be made, as type of polyamide, for example, of semicrystalline or amorphous polyamides, such as aliphatic or semi-aromatic polyamides. Mention may in particular be made of (co)polyamides 6, 6.6, 4.6, 6.10, 6.12, 11, 12, and/or blends, such as polyamides 6/6.6.

The technical textiles, technical textile residues and in particular airbag residues, such as bags or bag remnants or cuts or offcuts of bags, are generally cut up or ground and then put into the form of particles, such as powder, for example.

The mixture clarified above can in particular be obtained according to processes which are standard and known, in particular in the field of the paper industry, such as, for example, micronization, mechanical rubbing or the use of a defibrator.

It is possible, for example, to carry out a micronization using blades, a micronization using compressed gas, a micronization using the rotor/stator shearing action or also a micronization carried out between the profiled grinding elements of a stationary micronization disk and of a rotating micronization disk.

It is preferable to obtain the mixture of particles of stage a) by grinding and then micronizing.

It is possible, for example, to carry out a micronization of the residues, generally preground, by micronization, in particular in a knife mill or disk mill equipped with a screen. This screen can exhibit a mesh of between 50 and 800 µm. According to such a process, two types of particles are generally observed after micronization: spherical or quasi-spherical particles and fibrous particles.

The particles after micronization according to the invention comprise fibrous thermoplastic particles and particles which are in particular spherical or substantially spherical. The particles of the coating material advantageously have a mean diameter of between 50 and 300 µm. The fibrous thermoplastic particles advantageously have a length of between 200 and 1100 µm.

At this stage of the process, the fibrous thermoplastic particles are still partially coated with the coating material.

The size of these spherical coating particles can be measured by optical microscopy or scanning electron microscopy.

In addition, the particles preferably exhibit a median diameter D50 of between 50 and 500 µm, more preferably between 100 and 350 µm. The particle size distribution of the objects can be obtained by laser diffraction measurement, in particular on a particle sizer from Malvern, for example by using the wet route module. All the particles are compared to spheres, without taking into account their aspect ratio in this calculation. The D50 mesh is the dimension such that 50% of the particles are smaller than this dimension and 50% of the particles are larger than this dimension. The laser diffraction particle size analysis can be carried out according to the instructions of the standard AFNOR ISO 13320-1. By way of example, the particle size distribution can be measured by following the following protocol: a Malvern Master sizer 2000 light diffraction particle sizer equipped with the Hydro S module is used, after suspending the sample in ethanol. The measurement conditions are as follows: stirring in the cell of the particle sizer: 1400 rev/min; optical model: Fraunhofer; measurement range: from 100 nm to 3000 µm.

The mixture of particles obtained in stage a) is then suspended with a medium which makes possible the separation of the coating particles and fibrous thermoplastic particles; said medium exhibits a density between the density of the fibrous thermoplastic particles and the density of the coating material.

In particular, said medium exhibits a density within a range extending from $$0.95 \times ((\mu_{fth} + \mu_{mrev})/2) \text{ to } 1.05 \times ((\mu_{fth} + \mu_{mrev})/2)$$

where
$\mu_{fth}$ represents the density of the fibrous thermoplastic particles and
$\mu_{mrev}$ represents the density of the coating material.

More particularly, said medium exhibits a density within a range extending from $0.98 \times ((\mu_{fth} + \mu_{mrev})/2)$ to $1.02 \times ((\mu_{fth} + \mu_{mrev})/2)$, indeed even within a range extending from $0.99 \times ((\mu_{fth} + \mu_{mrev})/2)$ to $1.01 \times ((\mu_{fth} + \mu_{mrev})/2)$.

The medium can exhibit a density of between 1 and 1.5, in particular between 1.03 and 1.5, for example between 1 and 1.12, and more particularly between 1.05 and 1.12 g/cm$^3$.

The density of a body taken is a physical quantity which characterizes the weight of a homogeneous material per unit of volume.

The medium which makes possible the separation of the coating and the fibrous thermoplastic particles depends essentially on the materials making up the technical textiles.

In particular, this medium is an aqueous solution. Very particularly, this solution is devoid of alcohol, in particular of $C_1$-$C_6$ alcohol type and/or of ethylene glycol type; more particularly still, it is devoid of solvents other than water.

According to one alternative form, this medium is devoid of surfactant. More particularly still, said medium is essentially composed of water and optionally a base or an acid, in particular a base.

Use may be made, for example, of an alkaline medium, in particular exhibiting a pH of greater than or equal to 10, more preferably a pH of 14, in particular for carrying out the separation of the silicone coatings on thermoplastic fibers. Various alkaline chemical processes are known to dissociate the polyamide material from the material making up the coating. Mention may in particular be made of the patent application WO2007/135140 for this purpose. Said medium can in particular be an aqueous solution comprising an alkali metal or alkaline earth metal hydroxide. Mention may in particular be made, as alkali metal hydroxide, of LiOH, NaOH and KOH.

For the other coatings, alkaline or acidic solutions or solutions of organic or metal salts will be chosen, the concentrations of which will be adjusted in order for the density of the solution to be between those of the fibrous thermoplastic particles and of the coating.

The suspending can be carried out by mixing and stirring, for example. The suspension can exhibit a solid/liquid ratio ranging from 10% to 50%, in particular from 15% to 40%, for example from 20% to 30%.

In particular, the suspending stage b) is carried out at a temperature ranging from 10° C. to 80° C., very particularly from 15° C. to 50° C., indeed even at ambient temperature, that is to say from approximately 18° C. to approximately 25° C. According to an alternative form, this stage is devoid of heating. This exhibits in particular the advantage of limiting the financial and energy cost of this process.

The process can thus make possible a short residence time of the particles in suspension in stage b). Thus, the residence time of these particles in suspension can be less than 45 minutes, in particular than 30 minutes, in particular than 20 minutes, very particularly than 10 minutes, indeed can even be approximately 5 minutes.

At this stage of the process, the fibrous thermoplastic particles are virtually all detached from the coating material, which occurs in spherical or essentially spherical form in the medium.

The separation by the centrifugal force of the fibrous thermoplastic particles, on the one hand, and of the particles of coating material, on the other hand, can be carried out in various ways by the centrifugal force.

It is preferable in particular to use a technique of centrifugal decanting or centrifuging based on the centrifugal force created by rotating the suspension, in particular at high speed, in a rotating machine, such as a centrifuge, a bowl centrifuge, a bowl screw centrifuge or a plate separator.

It is preferable in particular to use horizontal-axis centrifugal decanters, referred to as HACDs, which make it possible in particular to separate solid particles from the carrier liquid by centrifugal decanting. The suspension enters a cylindroconical bowl in which a screw conveyor is positioned. The liquid forms a liquid ring in the bowl, whereas the solids, by the centrifugal effect, are flattened against the surface of the bowl. The centrate is then discharged by overflowing at the level of the cylindrical part of the machine, whereas the solids deposited on the bowl are conveyed by the screw in the direction of the cylindrical part of the machine, where they are discharged.

It is possible in particular to use, for this purpose, a centrifugal decanter such as mentioned in the application WO9740941. Mention may also be made of the centrifuges from Flottweg, such as the Tricanter®, the Sedicanter® and the Sorticanter®.

The suspension to be separated is then introduced into the decanter by an axial feed pipe. The product is gradually accelerated in the dispensing chamber before being introduced into the bowl by appropriate orifices. The bowl, of cylindroconical shape, rotates at an optimized speed. The suspension rotates with the bowl at the operating speed and forms a concentric layer on the internal wall of the bowl. The solid particles present in the suspension are flattened against the wall of the bowl under the effect of the centrifugal field. The diameter, the length of the cylindrical section and the angle of the cone are defined according to the specific requirements of the application. The conveying screw rotates at a different speed from that of the bowl, which allows it to convey the solid particles which have decanted toward the conical end of the bowl. The differential speed determines the retention time of the solid particles in the bowl and consequently the dryness of the solids extracted. It can be adjusted while running, for the purpose of optimizing the separation. The screw pitch and the number of threads form part of the main design variables. The separated solids are discharged at the conical end of the bowl into the sediment collector and then fall by gravity into the discharge hopper.

The fibrous thermoplastic particles recovered on conclusion of stage c) can then optionally be treated in order to neutralise the pH, in particular after having used an alkaline medium in stage b). Neutralization can be carried out with water or an acid, for example.

Drying may be necessary to remove or reduce the content of water or other liquid of the fibrous thermoplastic particles. The drying techniques can be mechanical or thermal. Preference is given in particular to evaporation by hot air. The heat can be transferred by convection, infrared radiation, conduction, microwaves or high frequency.

The present invention also relates to fibrous thermoplastic particles capable of being obtained by the process of the invention as described above.

The present invention also relates to the use of the fibrous thermoplastic particles as obtained in the manufacture of thermoplastic compositions, optionally comprising reinforcing or bulking fillers or various other additives conventionally used in the field.

The invention also relates to a thermoplastic composition, and to its process of preparation, obtained by melting the fibrous thermoplastic particles obtained according to the process of the invention. This composition can comprise at least one reinforcing and/or bulking filler.

In order to improve the mechanical properties of the composition according to the invention, it can be advantageous to add thereto at least one reinforcing and/or bulking filler preferably chosen from the group consisting of fibrous fillers, such as glass fibers, carbon fibers and aramid fibers, and non-fibrous inorganic fillers, such as clays, kaolin, mica, wollastonite and silica. The degree of incorporation of reinforcing and/or bulking filler is in accordance with the standards in the field of composite materials. It can, for example, be a content of filler of 1% to 80%, preferably of 10% to 70% and in particular between 20% and 50%, with respect to the total weight of the composition.

The composition according to the invention can additionally comprise additives normally used in the manufacture of polyamide compositions intended to be molded. Thus, mention may be made of lubricants, flame retardants, plasticizers, nucleating agents, catalysts, agents for improving the toughness, such as optionally grafted elastomers, light and/or heat stabilizers, antioxidants, antistatics, dyes, pigments, mattifying agents, molding aids or other conventional additives.

For the preparation of a composition, these fillers and additives can be added to the thermoplastic material by normal means suited to each filler or additive, such as, for example, during the polymerization or in the melt blending. The fillers are preferably added to the thermoplastic by the molten route, in particular during a stage of extrusion of the thermoplastic, or by the solid route, in a mechanical mixer, it being possible for the solid mixture to be subsequently melted, for example by an extrusion process. It is thus possible to obtain granules or powder to be molded intended for the manufacture of articles subsequently or else directly intended for the manufacture of articles, such as by molding, for example.

The fibrous thermoplastic particles can be blended with other thermoplastic materials, of the same or different nature.

Generally from 0.5% to 100% by weight, preferably from 5% to 90% by weight and more preferably from 15% to 80% by weight of fibrous thermoplastic particles are added, with respect to the total weight of the composition.

The compositions according to the invention can be used as starting material, for example as matrix, in particular in the field of technical plastics, for example in the preparation of articles obtained by molding, by injection molding, by injection/blow molding, by extrusion or by extrusion/blow molding, or by spinning, or in order to obtain film. The compositions can, for example, be used in the manufacture by extrusion of monofilaments, filaments, yarns and fibers. The articles can also be semifinished products in a great variety of dimensions which can be machined. Assemblages can be produced by welding or adhesive bonding, for example. The articles produced by extrusion can in particular be pipes, rods, profiled elements, plaques, sheets and/or hollow bodies.

The molded parts are produced by melting the granules produced above and feeding the molten composition into injection molding devices. The articles produced by injection molding can be parts of the motor vehicle, construction or electricity field.

A specific language is used in the description so as to facilitate understanding of the principle of the invention. Nevertheless, it should be understood that no limitation on the scope of the invention is envisaged by the use of this specific language. Modifications and improvements can in particular be envisaged by a person conversant with the technical field concerned on the basis of his own general knowledge.

The term and/or includes the meanings and, or and all the other possible combinations of the elements connected to this term.

Other details or advantages of the invention will become more clearly apparent in the light of the examples given below purely by way of indication.

EXPERIMENTAL PART

Manufacture of Particles According to the Invention

The airbags used are industrial waste, ground into pieces, based on polyamide 66 and coated on one face with cross-linked silicone. The content of silicone polymer is 10% by weight.

The airbags are cut up and then ground in a Herbold grinder comprising a row of stationary knives. Square-shaped residues of 2 cm×2 cm are thus obtained. These residues are then micronized by a Herbold microniser with a row of stationary knives and a row of moving knives and a 500 μm screen. Non-micronized residues will also be used by way of reference.

The fibrous thermoplastic particles are then present in the form of fibers with a length of between 0.8 and 1.5 mm and the particles of the coating material are then present in the form of quasispherical particles exhibiting a mean diameter of 200 μm. The size of these particles is measured by optical microscopy.

The particles exhibit a median diameter D50 of 108 μm.

Suspending

The particles are suspended in a liquid having a density of 1.1 g/cm$^3$, either the liquid 1 comprising sodium hydroxide and exhibiting a pH of 14 or the liquid 2 comprising magnesium sulfate and exhibiting a pH of the order of 7, by way of reference. The solid/liquid ratio is adjusted to between 20% and 30%.

Separation by the Centrifugal Force

The suspensions are then fed to a Sorticanter® from Flottweg, used for the separation of the polyamide particles and the coating particles, with the following parameters:

Rotational speed of the screw: 3000 revolutions/minute
Speed of the bowl of 1100 revolutions/minute
Temperature: 25° C.

The solid fractions present in the two exiting streams are measured and the compounds analyzed. The results are mentioned in table 1. The solid contents are determined by taking samples from the two exiting streams and drying at 80° C. in an oven at atmospheric pressure for at least one night. The solid content of each of the outlet streams is defined by weighing difference.

TABLE 1

|  | Material | Residence time | % solid in the light phase | % solid in the heavy phase | Yield (%) |
|---|---|---|---|---|---|
| C1 | Ground but non-micronized fabrics treated with an alkaline medium | >2 hours | 69.5 | 73.6 | 56 |
| C2 | Micronized fabrics treated with a non-alkaline medium | 30 minutes | 76.2 | 70.8* | 45.3 |
| C3 | Ground but non-micronized fabrics treated with a non-alkaline medium | 1 hour | 86 | 75* | <5 |
| 1 | Micronized fabrics treated with an alkaline medium | <5 minutes | 90.1 | 67 | 98.7 |

*high presence of coating particles

The yield is calculated by carrying out an elemental analysis of the silicon before the treatment on ground residues and after the treatment on the fibers forming the heavy solid phase.

It is thus apparent that the process according to the present invention makes possible the virtually complete removal of the silicone coating from the textile for very short residence times, with a separation medium devoid of additives, such as surfactants or alcohols, without heating said medium, and a very high yield.

The fibrous particles are subsequently rinsed with water, to regain a neutral pH, in a centrifuge and subsequently dried in a tunnel dryer with hot air.

Manufacture of Novel Formulations

The fibrous particles obtained in the various preceding examples are subsequently used to produce filler-comprising formulations comprising 30% by weight of standard glass fibers of E type from the supplier Vetrotex. Heat-stabilizing and antioxidizing additives were also introduced into the formulations.

By way of reference, in the test C4, a virgin polyamide of 66 type, Stabamid™ 27AE1 from Rhodia, with a VI of 138 ml/g, measured by the 3 AN 22 022 method, and with a melting point of 265° C., is used to produce a polyamide formulation comprising, as filler, 30% by weight of the same glass fibers.

The experiments were carried out on a Leistritz laboratory twin-screw extruder, the main characteristics of which are as follows: screw diameter D of 34 mm, axis separation of 30 mm and length of 35 mm. The temperature of the barrel was kept constant at 285° C. over the entire length of the screw. The screw profile was designed so that venting is carried out at the extruder tail. For each of the tests, the rotational speed of the screw is 290 rpm and the throughput of the extruder is 10 kg/h. Granules are obtained and used to produce test specimens by injection molding.

The mechanical performances are given in table 2 below. It is observed that, for one and the same waste in the form of a washed or unwashed powder, the mechanical performances are enhanced after washing and by the same level as for the 1$^{st}$ choice compound, this being by virtue of the efficiency of the separation.

TABLE 2

| Material | Impact strength (kJ/m$^2$) | Tensile modulus (MPa) | Tensile strength (MPa) |
| --- | --- | --- | --- |
| Fibrous particles resulting from test C1 | 74 | 9900 | 158 |
| Fibrous particles resulting from test C2 | 62 | 9500 | 143 |
| Fibrous particles resulting from test C3 | 56 | 9300 | 125 |
| Reference PA66 C4 | 82 | 10 300 | 184 |
| Fibrous particles resulting from test 1 of the invention | 81 | 10 600 | 183 |

The impact strength is measured according to the standard ISO1791eU. The tensile modulus and the tensile strength are measured according to the standard ISO527/1.

It is thus apparent that the treatment process according to the present invention makes it possible to prepare polyamide formulations exhibiting mechanical properties entirely comparable with the properties of a conventional formulation using a non-recycled polyamide matrix, which is not the case with the other treatments according to the prior art.

The invention claimed is:

1. A process for treating technical textiles, said technical textiles comprising thermoplastic fibers and a coating material and said process comprising the steps of:
   a) treating said textiles so as to obtain a mixture comprising:
      fibrous thermoplastic particles, and
      spherical or quasispherical particles of the coating material, said particles of the coating material exhibiting a mean diameter of between 15 and 750 µm;
   b) suspending the mixture obtained in step a) with an alkaline medium which makes possible the separation of the coating material and fibrous thermoplastic particles; said medium exhibiting a density between the density of the fibrous thermoplastic particles and the density of the coating material;
   c) separating the coating material and the fibrous thermoplastic particles by centrifugal force; and
   d) drying the fibrous thermoplastic particles.

2. The process of claim 1, wherein the thermoplastic fibers are based on polyamide, polyolefin, polyester, and/or polyurethane.

3. The process of claim 1 wherein the coating is based on polyvinyl chloride, polyurethane, acrylic, elastomers, and/or silicone.

4. The process of claim 1, wherein the technical textiles are airbag residues.

5. The process of claim 1, wherein the mixture of particles of step a) is obtained by grinding the technical textiles and then micronizing the ground technical textiles.

6. The process of claim 1, wherein the separation of step c) is carried out in a horizontal-axis centrifugal decanter.

7. The process of claim 1, wherein the medium of step b) is an aqueous medium.

8. The process of claim 1, wherein the alkaline medium of step b) exhibits a pH of greater than or equal to 10.

9. A process for treating airbag textiles, said airbag textiles comprising fibrous polyamide material and a silicone coating material, to recover polyamide material, said process comprising the steps of:
   a) grinding and micronizing said textiles to obtain a mixture comprising polyamide particles and silicone coating particles, said silicone coating particles exhibiting a mean diameter of between 15 and 750 µm;
   b) suspending the mixture obtained in step a) in an aqueous liquid medium having a pH of greater than or equal to 10 and a density between the density of the polyamide particles and the density of the silicone coating particles;
   c) separating polyamide particles from silicone coating particles by centrifugal force to recover the polyamide particles; and
   d) drying the recovered polyamide particles.

10. The process of claim 1, further comprising the step of treating the fibrous thermoplastic particles recovered in step c) in order to neutralise the pH.

11. The process of claim 9, further comprising the step of treating the polyamide particles recovered in step c) to neutralise the pH.

12. The process of claim 1, wherein the coating material separated is coating material particles.

* * * * *